UNITED STATES PATENT OFFICE.

LOUIS COLLARDON, OF WEST BROMWICH, ENGLAND.

MANUFACTURE OF RUBBER COMPOUNDS.

1,098,882.

Specification of Letters Patent.

Patented June 2, 1914.

No Drawing.

Application filed January 20, 1913. Serial No. 743,200.

*To all whom it may concern:*

Be it known that I, LOUIS COLLARDON, a citizen of Agentina, residing at 73 Bratt street, West Bromwich, in the county of Warwickshire, England, have invented new and useful Improvements in the Manufacture of Rubber Compounds, of which the following is a specification.

The invention relates to the production of compounds consisting of cellulose xanthate or other cellulose esters and rubber or rubber-like substances.

Several processes for combining rubber and cellulose compounds and also obtaining a vulcanized product have been proposed. It has also been proposed to incorporate resin with rubber and cellulose compounds.

My invention differs from previous inventions by reason of the fact that the cellulose esters are used in a pasty condition whereas in the case of previous inventions viscose in solution has been employed or nitrated cellulose, neither of which are suitable for the purposes of my invention.

According to my invention I produce materials or compositions consisting of cellulose esters and a small quantity of rubber or rubber-like substances sufficient to produce a coherent mass,—a raw material which can be readily mixed with rubber or other substances necessary for vulcanization and moreover gives a thoroughly uniform product. Furthermore as I use newly made cellulose xanthate in plastic form not in solution and certain kinds of caoutchouc which are particularly suitable for the production of a homogeneous composition the production of this raw material can be attained more quickly than is possible in the case of the product resulting from the above cited process.

Before describing methods of production or manufacture which I may adopt I will enumerate some of the rubber or rubber-like substances which may be used. The caoutchoucs which may be employed are those obtained from the West African coast, such as Conakry, Sierra Leone, Nigger Flake, Acra, Liberia lumps, Angola niggers, root rubber or the like, or soft rubbers such as those obtained from Borneo, Sumatra, Banjermassin or the Malay States, or the rubber obtained from *Dichopsis* or *Dichopsis polyantha* and many other similar trees. Mexican rubber, such as guayule, which is very rich in resin, can also be used. The rubber-like coagulate known to the natives as "brea," obtained from the latexes of certain large trees growing in the Amazon river territory, Peru, Bolivia, Columbia and Venezuela, which have not been botanically identified, is particularly suitable for the purpose of my invention as it will, especially while in a soft condition, readily combine with viscose and other cellulose esters. In addition to the above may be mentioned the coagulates of a great variety of caoutchouc-like trees, the so-called bastardos, which are often mixed with real caoutchouc, gutta-percha or balata, as well as the latexes of other trees, such as *Rhus vernicifera*, the juice of the unripe fruits of the kaki tree (*Diospyro Kaki L.*) and many other trees, especially those growing in China and Japan, such for instance as *Aleurites cordata*, *Dryandera cordata*, *Elæococca vernicia*. All these natural products and many others will be found to be useful for the purpose of my invention, one of the chief features of which is the use of resinous caoutchoucs, which render unnecessary the use of oily and fatty substances and the like, which only destroy or decrease the valuable properties of caoutchouc. Finally newly made synthetic caoutchouc, while still in a soft condition, or the polymerized hydrocarbons of the divinyl group are particularly suitable for the purpose of my invention since these chemical products readily combine with viscose or other cellulose esters and the mixture can be vulcanized with or without the addition of other caoutchoucs. Synthetic caoutchouc, and the same holds good with regard to the polymerized hydrocarbons of the divinyl group, possesses the important advantage that only a small quantity need be added to the cellulose xanthate or sulfohydrocellulose to produce a uniform product, an important advantage from the technical point of view.

When cellulose xanthate is used the improved compounds may be manufactured in the following manner: First of all alkali-cellulose is made which contains less alkali than is customarily used in the case of common xanthate, as the presence of smaller amount of undissolved fiber of cellulose will not render the alkali-cellulose unsuitable for the purpose of my invention. A suitable quantity of carbon bisulfid is added to the alkali-cellulose as soon as the latter has ripened, and after the reaction due to such addition has taken place the cellulose xanthate is worked between either cold or heated rollers until such time as a plastic body is produced. Soft or resinous rubber, either synthetic or natural, or soft regenerated rubber is then added in small quantities to this plastic body. The total amount of rubber which is added is merely just sufficient to produce a coherent substance which will not fracture or tear, when mixed or rolled or washed. The above named product is then formed, by passing it between slightly heated rollers, into thin sheets. These sheets which are homogeneous, as can be seen by holding them up to the light, still contain a slight quantity of moisture and alkali which must be removed to make the cellulose product perfectly insoluble. This may be effected by either drying them in an ordinary oven or in a vacuum apparatus or in steaming apparatus such as that used in the manufacture of textile goods. A few minutes are sufficient to render the xanthate insoluble, so that the impurities and the alkali can be removed by washing. After washing the material is centrifuged, again dried and sheeted. The drying must be carefully carried out so as to avoid failure during vulcanization, which would occur if the material were not fully dried. The product will then be ready to be used for making goods, i. e., to be mixed with definite quantities of sulfur, various chemicals, filling material and rubber, murac, balata or other rubber or rubber-like substances, according to requirements. The addition of sulfo-hydrocellulose, which is absolutely insoluble in any known solvent and which can be readily prepared by the addition of chlorid of sulfur to newly made cellulose xanthate, will change the nature of the product to a certain degree and enable other original materials to be closely imitated. This means that technical improvements of a very important nature can be achieved, especially in the manufacture of ebonite, artificial leather, linoleum and the like. Further the addition of sulfur, zinc oxid or zinc sulfid to the raw product, that is to say to the mixture of rubber and cellulose ester, is advantageous as it will greatly assist vulcanization and give the product better di-electric qualities.

According to another method of production suitable cellulose material is treated with a more or less concentrated solution of hydrochloric or sulfuric acid and after the cellulose material has become converted into a finely divided pulp chlorid of sulfur is added. An absolutely insoluble compound results, and this compound is thoroughly washed, then dried and finally reduced to a fine powder. Viscose (solution) may also be treated with sulfur chlorid and after being washed and dried may be reduced to a fine powder. Either of the fine powders so produced would be incorporated with rubber, guttapercha, balata, murac or other rubber or rubber-like substances.

The following are examples of relative proportions of the substances, which I have found to give satisfactory results:—

Example I: 10 kilos of undissolved cellulose xanthate in plastic form. 1–4 kilos of guayule rubber. 1 kilo of a soft resinous rubber, such as paste or flake. 1 kilo of zinc oxid or zinc sulfid. 200 grams of sulfur. 4–5 kilos of filling material.

The above are mixed thoroughly, rolled into thin sheets, dried, then steamed and washed, and finally thoroughly dried, molded and vulcanized.

Example II: 20 kilos of cellulose xanthate in plastic form. 1–4 kilos of a soft resinous rubber, such as paste or flake, or other rubber or rubber-like substance. 1 kilo of zinc sulfid. 1 kilo of zinc oxid. 1 kilo of sulfur.

The mixture is treated in the same way as No. I.

Example III: 10 kilos of cellulose xanthate in plastic form. 1–2 kilos of synthetic rubber. 4 kilos of recovered rubber. 1 kilo of sulfur. 5 kilos of filling material.

The mixture is treated in the same way as No. I.

Example IV: 20 kilos of cellulose xanthate in plastic form. 4 kilos of rubber resin. 4 kilos of reclaimed soft rubber. ½ kilo of sulfur.

The mixture is treated in the same way as No. I.

Example V: 10 kilos of dry sulfo-hydrocellulose. 5 kilos of filling material. 2–4 kilos of soft rubber. ½ kilo of sulfur.

The mixture is treated in the same way as No. I.

Having now described my invention what I have invented and desire to secure by Letters Patent of the United States is as follows:—

1. A process for the production of waterproof compounds, consisting in treating cellulose with a reagent adapted to form a solution therewith, treating the solution in order to form a cellulose compound substantially free from water, mixing the compound with a small quantity of rubber to produce a coherent mass, and with a vulcanizing agent, and vulcanizing the product.

2. A process for the production of waterproof compounds, consisting in preparing cellulose xanthate solution, treating the same in order to expel free moisture and to reduce the product to a plastic form, mixing the plastic product with sufficient rubber to produce a coherent mass, adding a vulcanizing agent to the mass, and vulcanizing the product.

3. A process for the production of waterproof compounds, consisting in preparing cellulose xanthate solution, treating the same in order to expel free moisture and to reduce the product to a plastic form, mixing the plastic product with sufficient rubber to produce a coherent mass, passing the mixture through heated rollers to form sheets, further heating the product in order to finally dry the same and to render the cellulose compound insoluble, washing the product, centrifuging and drying the same, and finally vulcanizing the product.

In testimony whereof I have signed my name to this specification in the presence of two subscribing witnesses.

LOUIS COLLARDON.

Witnesses:
ARTHUR F. ENNIS,
H. D. JAMESON.